United States Patent
Hou

(10) Patent No.: US 9,985,714 B1
(45) Date of Patent: *May 29, 2018

(54) SYSTEMS AND METHODS FOR SIMULTANEOUS BACKHAUL MANAGEMENT FOR MULTIPLE RELAY NODES

(71) Applicant: Sprint Spectrum LP, Overland Park, KS (US)

(72) Inventor: Pei Hou, Herndon, VA (US)

(73) Assignee: Sprint Spectrum L.P., Overland Park, KS (US)

(*) Notice: Subject to any disclaimer, the term of this patent is extended or adjusted under 35 U.S.C. 154(b) by 0 days. days.

This patent is subject to a terminal disclaimer.

(21) Appl. No.: 14/600,227

(22) Filed: Jan. 20, 2015

(51) Int. Cl.
| | |
|---|---|
| *H04B 7/155* | (2006.01) |
| *H04B 7/06* | (2006.01) |
| *H04B 7/04* | (2017.01) |
| *H04W 72/04* | (2009.01) |
| *H04B 7/0413* | (2017.01) |

(52) U.S. Cl.
CPC ....... *H04B 7/15507* (2013.01); *H04B 7/0413* (2013.01); *H04B 7/063* (2013.01); *H04B 7/0617* (2013.01); *H04W 72/046* (2013.01)

(58) Field of Classification Search
CPC .. H04B 7/0413; H04B 7/0417; H04B 7/0617; H04B 7/086; H04B 7/0452; H04B 7/0695; H04B 7/15507; H04B 7/063; H04W 72/1226; H04L 5/0026; H04L 5/0048

See application file for complete search history.

(56) References Cited

U.S. PATENT DOCUMENTS

| | | | |
|---|---|---|---|
| 8,116,698 B2 | 2/2012 | Hedayat et al. | |
| 8,134,503 B2* | 3/2012 | Na | H04B 7/0413 342/370 |
| 8,630,267 B1* | 1/2014 | Jin | H04W 16/28 370/252 |
| 9,444,570 B1* | 9/2016 | Mansour | H04J 11/00 |
| 2008/0090575 A1* | 4/2008 | Barak | H04B 7/0417 455/444 |
| 2014/0139372 A1* | 5/2014 | Seol | H01Q 3/2605 342/367 |
| 2015/0016379 A1* | 1/2015 | Nam | H04B 7/0456 370/329 |

* cited by examiner

*Primary Examiner* — George Eng
*Assistant Examiner* — Hung Du

(57) ABSTRACT

In systems and methods for establishing communication between a wireless device and a communication network, one or more sounding signals are received from one or more relay nodes. One or more parameters of beam formation are determined based on the received one or more sounding signals. Formation of one or more beams is initiated from two or more antennas to the one or more relay nodes based on the determined one or more beam formation parameters. The total number of the formed beams and the formation of the beams are adjusted dynamically based on the received sounding signals from the relay nodes.

17 Claims, 8 Drawing Sheets

SYSTEMS AND METHODS FOR SIMULTANEOUS BACKHAUL MANAGEMENT FOR MULTIPLE RELAY NODES

TECHNICAL BACKGROUND

Wireless communication can be used as a means of accessing a communication network. Wireless communication has certain advantages over wired communications for accessing a network. For example, implementing a wireless interface can eliminate a need for a wired infrastructure, thereby reducing the cost of building and maintaining network infrastructure. In addition, a wireless network can support added mobility by allowing a wireless device to access the network from various locations or addresses. To use wireless communication to access a network, a user needs to have at least one transceiver in active communication with another transceiver that is connected to the network.

In many wireless communication systems, when a wireless device attempts to access the network by attaching or reattaching to the network, the wireless device is serviced through one or more access nodes of the communication system. The access nodes coordinate with one or more controller and/or gateway nodes to establish a connection that places the wireless device in communication with the network.

Overview

In operation, one or more sounding signals are received from one or more relay nodes. One or more parameters of beam formation are determined based on the received one or more sounding signals. Formation of one or more beams is initiated from two or more antennas to the one or more relay nodes based on the determined one or more beam formation parameters.

DETAILED DESCRIPTION

Figure 1:
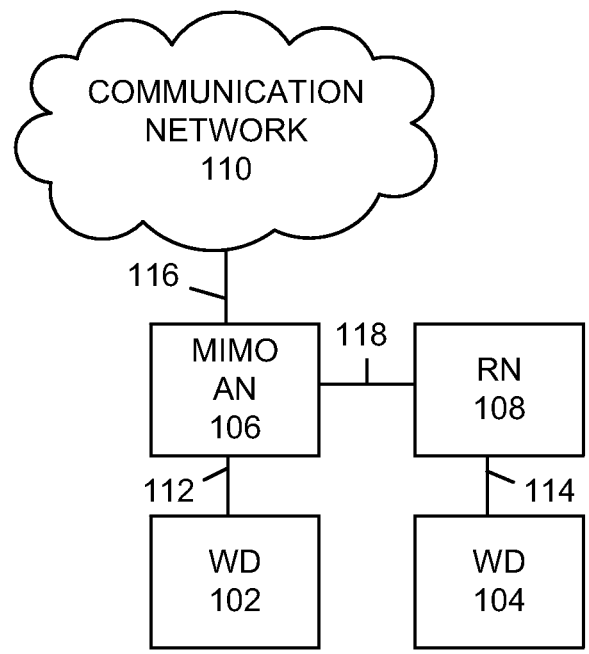
FIG. 1 illustrates an exemplary communication system for transmitting data between a communication network and a wireless device.

FIG. 1 illustrates an exemplary communication system 100 to manage communications of an access node and a relay node comprising wireless devices 102 and 104, multiple-input multiple-output (MIMO) access node 106, relay node 108, communication network 110, and communication links 112, 114, 116, and 118. Other network elements may be present in the communication system 100 to facilitate communication but are omitted for clarity, such as controller nodes, base stations, base station controllers, gateways, mobile switching centers, dispatch application processors, and location registers such as a home location register or visitor location register. Furthermore, other network elements may be present to facilitate communication between MIMO access node 106, relay node 108, and communication network 110, which are omitted for clarity, including additional processing nodes, routers, gateways, and physical and/or wireless data links for carrying data among the various network elements.

Wireless devices 102 and 104 can be any device configured to communicate over communication system 100 using a wireless communication link. For example, wireless devices 102 and 104 can include a cell phone, a smart phone, a computing platform, such as a laptop, palmtop, or a tablet, a personal digital assistant, or an internet access device, combinations thereof, or any other suitable device configured for wireless communication. It is noted that while one wireless device is illustrated in FIG. 1 as being in communication with each of MIMO access node 106 and relay node 108, any number of wireless devices can be implemented in other embodiments.

Wireless devices 102 and 104 can communicate with MIMO access node 106 and relay node 108 over communication links 112 and 114. Communication links 112 and 114 can each include a frequency band. While two frequency bands are illustrated in FIG. 1 for conciseness, MIMO access node 104 and wireless devices 102 and 104 can also communicate over a greater number of frequency bands in other embodiments.

MIMO access node 106 and relay node 108 are network nodes capable of providing wireless communications to wireless devices 102 and 104, and can be, for example, a base transceiver station, a radio base station, an eNodeB device, a macro eNodeB device, or an enhanced eNodeB device. In an embodiment, MIMO access node 106 may include a macro cell while relay node 108 may include a small cell (e.g., femto cell, pico cell, micro cell, or the like) such that the coverage radius (e.g., the radius around each node where a wireless device may detect wireless signals transmitted from the node at a signal level above a threshold) for the macro cell is larger than the coverage radius for the small cell. As such, a macro cell may transmit wireless signals with a greater signal level (e.g., use a higher transmission power) than a small cell. MIMO access node 106 may communicate with communication network 110 over communication link 116. Relay node 108 may communicate with communication network 110 via MIMO access node 106 or using a separate communication link (not illustrated). MIMO access node 106 and relay node 108 may also communicate directly with each other over communication link 118.

Although only MIMO access node 106 and relay node 108 are illustrated in FIG. 1, wireless devices 102 and 104 can be in communication with a plurality of access nodes and/or relay nodes. The plurality of access nodes and/or relay nodes can be associated with different networks and can support different communication protocols and radio access technologies.

Communication network 110 can be a wired and/or wireless communication network, and can include processing nodes, routers, gateways, and physical and/or wireless data links for carrying data among various network elements, including combinations thereof, and can include a local area network, a wide area network, and an internetwork (including the Internet). Communication network 110 can be capable of carrying voice information and other information, for example, to support communications by a wireless device such as wireless device 102. Wireless network protocols may include code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, and Third Generation Partnership Project Long Term Evolution (3GPP LTE). Wired network protocols that may be utilized by communication network 108 include Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 110 may also include a wireless network, including base stations, wireless communication nodes, telephony switches, internet routers, network gateways, computer systems, communication links, or some other type of communication equipment, and combinations thereof.

Communication links 112, 114, 116, and 118 can be wired or wireless communication links. Wired communication links can include, for example, twisted pair cable, coaxial cable or fiber optic cable, or combinations thereof. Wireless communication links can include a radio frequency, microwave, infrared, or other similar signal, and can use a suitable communication protocol, for example, GSM, CDMA, UMTS, HSPA, EV-DO, or 3GPP LTE, or combinations thereof. Other wireless protocols can also be used.

Other network elements may be present in communication system 100 to facilitate wireless communication, but such elements are omitted for clarity. Network elements that may be present in other embodiments may include, but are not limited to, controller nodes, base stations, base station controllers, gateways, mobile switching centers, dispatch application processors, and location registers, such as a home location register or visitor location register. Furthermore, other network elements may be present to facilitate communication between MIMO access node 106 and communication network 110, which are omitted for clarity, but may include additional processing nodes, routers, gateways, and physical and/or wireless data links for carrying data among the various network elements.

In a typical communication system, such as communication system 100, the use of relay nodes, such as relay node 108, for wireless backhaul back to the communication network 110 may offer one or more advantages, such as enabling the network coverage area to be extended, reducing monetary cost (e.g., by reducing or eliminating the need to pay a local partner for local line usage), and providing simple and quick installation (e.g., due to the small size and low power nature of certain available relay nodes). However, the use of relay nodes in conventional systems also introduces drawbacks in certain embodiments. For example, the transmission power and range of the backhaul link may be limited and/or the backhaul capacity may be limited due to a shared spectrum between the relay link and the macro eNodeB.

However, some presently disclosed embodiments may address one or more of these drawbacks, thus enabling use of relay nodes while reducing or eliminating the foregoing disadvantages. For example, certain embodiments utilize a MIMO access node configured to employ massive MIMO utilizing multiple antennas along with beamforming to enable the MIMO access node to simultaneously support multiple relay nodes. By utilizing beamforming along with the massive MIMO techniques disclosed herein, the backhaul link range may be boosted, thus reducing or eliminating the bottlenecking that may occur during backhaul in traditional systems.

Presently contemplated embodiments may include use of any appropriate MIMO technique. For example, some embodiments may employ diversity reception and/or transmission during which the same information is transmitted on multiple antennas, thus increasing the likelihood of the signal reaching its desired destination and increasing the robustness of the wireless channel. Other embodiments may employ a technique in which different information bit streams are transmitted on separate antennas (i.e., spatial multiplexing), thus increasing the capacity of the wireless propagation channel. Indeed, any suitable MIMO technique may be employed in accordance with disclosed embodiments, for example, to increase the capacity of the wireless link and the robustness of the radio signal.

Figure 2:
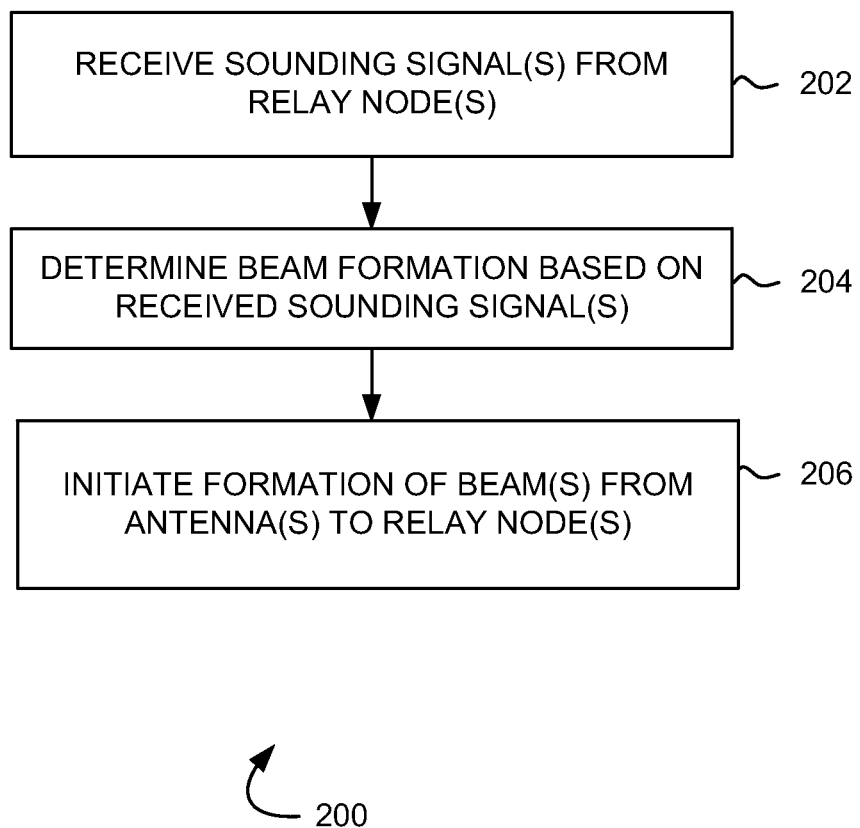
FIG. 2 illustrates an exemplary method of establishing communication between a MIMO access node and a relay node.

In particular, in one operational embodiment of the system of FIG. 1, the MIMO access node 106 may employ a method 200 shown in FIG. 2. The method 200 includes receiving one or more sounding signals from one or more relay nodes (block 202). For example, in one embodiment, the MIMO access node 106 may receive an uplink sounding signal from relay node 108, which contains information about the quality of the transmission channel, the location of the relay node 108, and so forth. In some embodiments, only a single sounding single may be received from only a single relay node, whereas in other embodiments, multiple relay nodes may each send a sounding signal to the MIMO access node 106.

The method 200 further includes determining beam formation based on the one or more received sounding signals (block 204). For example, in one embodiment, the MIMO access node 106 may determine that a single uplink sounding signal has been received from the single relay node 108 and may determine that only a single appropriate beam needs to be formed for transmission to the relay node 108. The method 200 then includes initiating formation of the one or more beams from one or more antennas to one or more relay nodes (block 206). In forming the beam, the MIMO access node 106 may utilize any of a variety of suitable beamforming steps, for example, by performing channel estimation and obtaining a channel matrix for the beam, performing channel estimation for the beam, calculating the channel covariance channel matrix for the beam, calculating weighting vectors for the beam based on the covariance matrix and angle of arrival of the beam, and applying the weighting vectors to the corresponding signal streams before combining the streams for transmission via one or more antennas.

Figure 3:
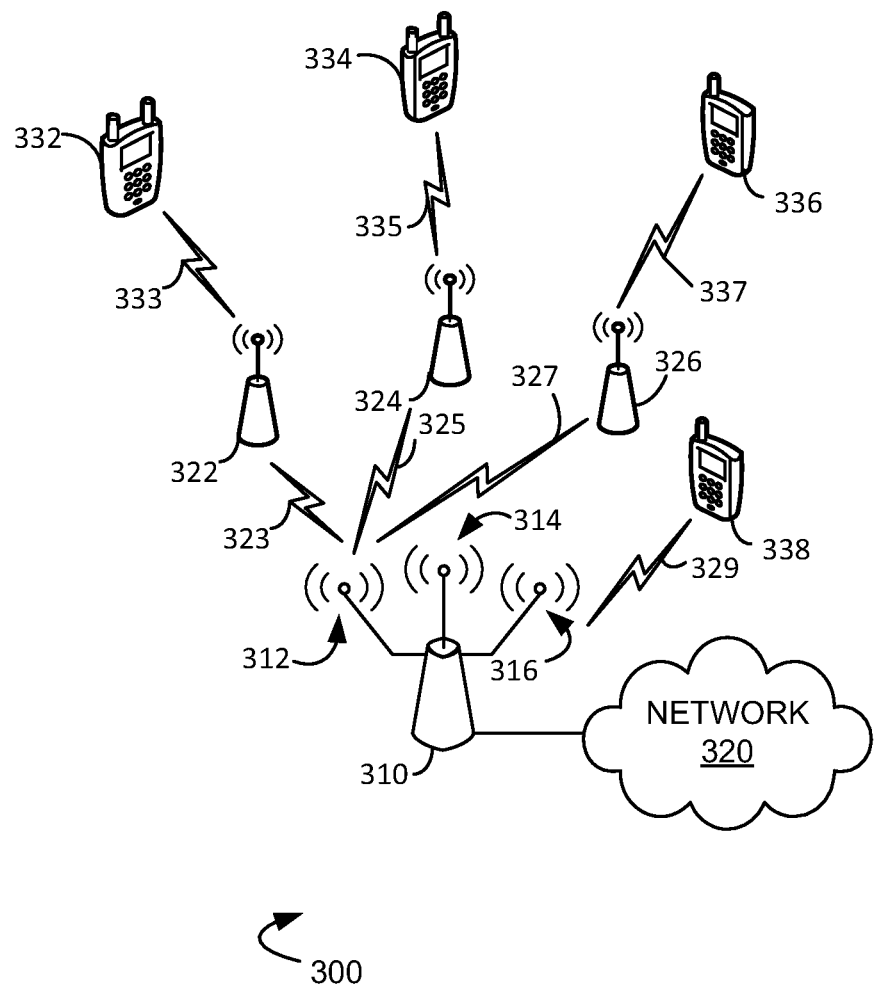
FIG. 3 illustrates another exemplary communication system for transmitting data between a communication network and a wireless device.

FIG. 3 is a schematic of a communication system 300 including MIMO access node 310, relay node 322, relay node 324, relay node 326, wireless device 332, wireless device 334, wireless device 336, wireless device 338, and network 320. Wireless device 332 is operatively coupled to relay node 322 by wireless link 333, and relay node 322 is operatively coupled to MIMO access node 310 via wireless link 323. Similarly, wireless device 334 is operatively coupled to relay node 324 by wireless link 335, and relay node 324 is operatively coupled to MIMO access node 310 via wireless link 325. Likewise, wireless device 336 is operatively coupled to relay node 326 by wireless link 337, and relay node 326 is operatively coupled to MIMO access node 310 via wireless link 327. Wireless device 338 is operatively connected to MIMO access node 310 via wireless link 329.

The network 320 is operatively coupled to MIMO access node 310. MIMO access node 310 includes at least a first antenna 312, a second antenna 314, and a third antenna 316. However, it should be noted that the illustrated connections are merely examples not meant to limit presently contemplated embodiments. For example, in many embodiments disclosed herein, each of the relay nodes 322, 324, and 326 may be coupled to MIMO access node 310 via multiple wireless links, for instance, by receiving one beam from each of the antennas 312, 314, and 316 of MIMO access node 310.

The communication system 300 is a communication network that can provide wireless communication to wireless devices 332, 334, 336, and 338. Network 320 is a communication network that can provide communication between MIMO access node 310 and other wired or wireless networks. Communication system 300 can include wired and/or wireless communication networks that include processing nodes, routers, gateways, physical and/or wireless data links for carrying data among various network elements, including combinations thereof, and can include a local area network, a wide area network, and an internetwork (including the Internet). Communication system 300 can also include wireless networks, including base station, wireless communication nodes, telephony switches, internet routers, network gateways, computer systems, communication links, or some other type of communication equipment, and combinations thereof.

Wired network protocols that may be utilized by communication system 100 and/or network 320 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Wireless network protocols that may be utilized by communication system 100 and/or network 320 may comprise code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX).

Links between access node 310 and network 320 can be, for example, twisted pair cable, coaxial cable or fiber optic cable, or combinations thereof. Wireless links 333, 335, 337, 323, 325, 327, and 329 can be a radio frequency, microwave, infrared, or other similar signal that uses orthogonal frequency division multiplexing (OFDM). Wireless links 333, 335, 337, 323, 325, 327, and 329 can use a suitable communication protocol, for example, Worldwide Interoperability for Microwave Access (WiMAX), or Long Term Evolution (LTE), or combinations thereof. Other wireless protocols can also be used.

Other network elements may be present in communication system 300 (and present in wireless network 320, in particular) to facilitate wireless communication to/from wireless devices 332, 334, 336, and 338, but are omitted for clarity, such as base stations, base station controllers, gateways, mobile switching centers, dispatch application processors, and location registers such as a home location register or visitor location register. Furthermore, other network elements may be present to facilitate communication between MIMO access node 310 and network 320, which are omitted for clarity, including additional processing nodes, routers, gateways, and physical and/or wireless data links for carrying data among the various network elements.

Wireless devices 332, 334, 336, and 338 may be any devices, systems, combination of devices, or other such communication platforms capable of communicating wirelessly with MIMO access node 310. One or more of wireless device 332, 334, 336, and 338 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can exchange audio or data with via MIMO access node 310, and network 320. Other types of communication platforms are possible.

Wireless devices 332, 334, 336, and 338 may establish communication sessions with access node 310 in order to receive communication service. This communication service may include voice service and data service. This communication service may include a plurality of services. These services may include but are not limited to telephone service, long distance service, mobile voice service, mobile data service, push-to-talk service, internet service, web browsing, email, pictures, picture messaging, video, video messaging, audio, voicemail, music, MP3's, ring tones, stock tickers, news alerts, and so on.

MIMO access node 310 is a network node capable of providing wireless communication to wireless devices 332, 334, 336, and 338. MIMO access node 310 can be, for example, a base transceiver station, a radio access node, an eNodeB device a macro eNodeB device, or an enhanced eNodeB device. MIMO access node 310 communicates information to wireless devices 332, 334, 336, and 338 via one or more beams formed via any suitable beamforming process. The communicated information may include reference signals and data signals.

For example, MIMO access node 310 may communicate information via wireless links using subframes. A subframe may be divided into basic air interface units. These air interface units may be referred to as resource blocks. For example a resource block may be defined in both the time and frequency domains. A resource block may occupy a discrete time interval in the time domain and a discrete number of carriers in the frequency domain. A resource block may be further divided into smaller units in the time and frequency domains. These smaller units may be referred to as resource elements.

For example, in some embodiments, long-term evolution (LTE) defines a resource block as 0.5 mS in the time domain and hundred and 180 kHz in the frequency domain. The 0.5 mS in the time domain can hold 6 or 7 OFDM symbols for each of 12 subcarriers (15 kHz each) that make up the 180 kHz in the frequency domain. The grid generated by subcarriers in the frequency domain and symbols and the time domain defines a set of resource elements. Thus, a single resource block may have 84 (or 72) resource elements. A single resource element can accommodate a single modulation symbol.

In an embodiment, communication system 300 allocates a frame and/or subframe of air interface resource elements to be transmitted via a first antenna (e.g., antenna 312). These resource elements include reference signal resource elements and data signal resource elements. The reference signal resource elements carry information, at specified power levels, which is known or can be deduced. Thus the reference signal resource elements may be used for synchronization, channel estimation, cell selection, and handover. The data signal resource elements carry the information associated with physical channels. In other words, the data signal resource elements carry data and/or control information for the wireless links.

Communication system 300 also allocates a subframe of air interface resource elements to be transmitted via a second antenna (e.g., antenna 314). These resource elements in the subframe to be transmitted via the second antenna also include reference signal resource elements and data signal resource elements. At least some of the data signal resource elements allocated to be transmitted via the second antenna correspond in time and frequency to reference signal resource elements to be transmitted via the first antenna. In other words, when a subframe is simultaneously being transmitted from the first antenna 312 and another subframe is being transmitted from the second antenna 314, at least some of the reference signal resource elements in the first subframe will overlap at least some of the data signal resource elements in the second subframe.

Similarly, communication system 300 also allocates a subframe of air interface resource elements to be transmitted via a third antenna (e.g., antenna 316). These resource elements in the subframe to be transmitted via the third antenna also include reference signal resource elements and data signal resource elements. At least some of the data signal resource elements allocated to be transmitted via the third antenna correspond in time and frequency to reference signal resource elements to be transmitted via the first and second antennas. In other words, when a subframe is simultaneously being transmitted from the first antenna 312, another subframe is being transmitted from the second antenna 314, and a further subframe is being transmitted from the third antenna 316, at least some of the reference signal resource elements in the first subframe will overlap at least some of the data signal resource elements in the second subframe, which will overlap with at least some of the data signal resource elements in the third subframe.

In some embodiments, subframes (and/or frames) are transmitted from the first antenna 312, the second antenna 314, and the third antenna 316 simultaneously, using a multi-antenna mode. This multi-antenna mode may be referred to as a MIMO technique. MIMO techniques may also be known as a spatial multiplexing, which may increase transmit diversity, thereby increasing the resilience of the propagation channel.

Figure 8:
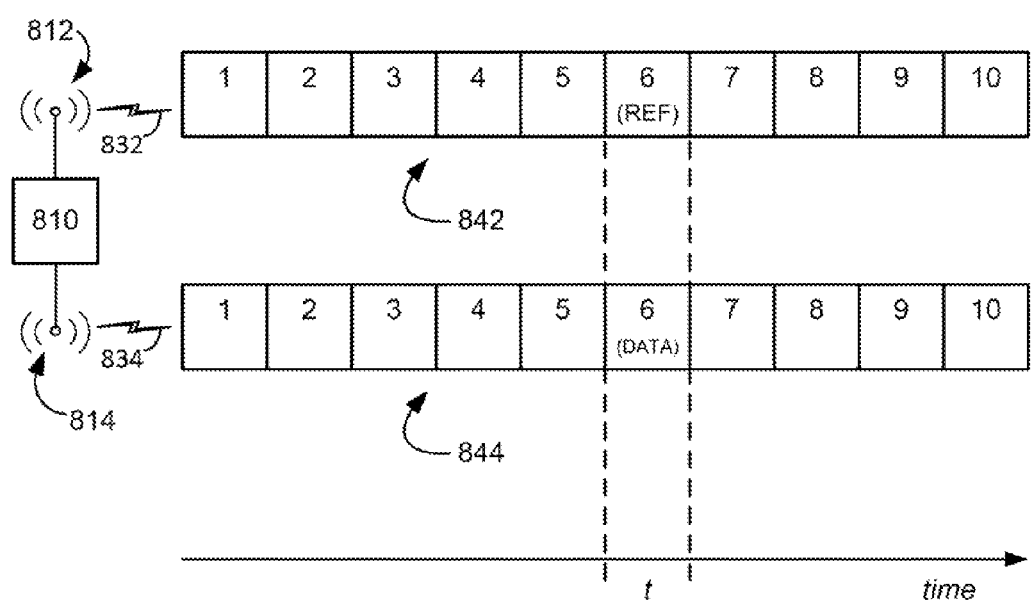
FIG. 8 illustrates two antennae of a MIMO access node simultaneously transmitting subframes containing reference signal resource elements and data signal resource elements, respectively.

FIG. 8 illustrates two antennae 812, 814 of a MIMO access node 810 simultaneously transmitting frames 842, 844 containing reference signal resource elements and data signal resource elements, respectively. Each of frames 842, 844 include a plurality of subframes labeled 1-10. Subframe 6 in frame 842 transmitted via antenna 812 also includes at least one reference signal resource element. Similarly, subframe 6 in frame 844 transmitted via antenna 814 also includes at least one data signal resource element. Since frames 842 and 844 are transmitted simultaneously by antennae 812, 814 respective, at least some of the data signal resource elements allocated to be transmitted via antenna 814 correspond in time t and frequency 832, 834 to reference signal resource elements to be transmitted via antenna 812. In other words, when subframes 6 are simultaneously being transmitted from antenna 812 and antenna 814, at least some of the reference signal resource elements in frame 842 will overlap at least some of the data signal resource elements in frame 844.

In one or more presently disclosed embodiments, a MIMO technique may be utilized in combination with a beamforming technique over wireless links 323, 325, and 327. For example, in one method 400 shown in FIG. 4, a MIMO access node may receive sounding signals from relay nodes (block 402). For example, MIMO access node 310 may receive two sounding signals, one from each of relay nodes 322, 324, and 326. The quantity of relay nodes in the system is then determined based on the quantity of received sounding signals (block 404). For example, in the embodiment shown in FIG. 3, MIMO access node 310 may determine that three relay nodes are present.

The MIMO access node then determines the quantity of beams to form based on the quantity of relay nodes detected (block 406) and an angle for each beam to be formed (block 408). For example, the MIMO access node 310 may estimate the direction of arrival of the signals sent to the MIMO access node 310 from the relay nodes 322, 324, and 326 and use this estimated direction of arrival to determine the angle at which the beam(s) should be formed from the antennas 312, 314, and 316.

Once the angle and quantity of beams are determined, the method 400 includes initiating formation of the determined quantity of beams at the determined angles from each antenna of a plurality of antennas (block 410). This step may include, for example, performing channel estimation and obtaining a channel matrix for each beam, performing channel estimation for each beam, calculating a channel covariance channel matrix for each beam, calculating weighting vectors for each beam based on the covariance matrix and angle of arrival of each signal, applying the weighting factors to the corresponding signal streams, and combining the streams and transmitting the combined streams through the antenna elements 312, 314, and 316.

Further, presently contemplated embodiments may utilize any appropriate MIMO technique. For example, some embodiments may employ diversity reception and/or transmission during which the same information is transmitted from multiple antennas (e.g., the signals transmitted by each of antennas 312, 314, and 316 each carry the same information), thus increasing the likelihood of the signal reaching its desired destination and increasing the robustness of the wireless channel. Other embodiments may employ a technique in which different information bit streams are transmitted on separate antennas in a spatial multiplexing technique (e.g., the signals transmitted from the multiple beams formed from antennas 312, 314, and 316 each carry different information), thus increasing the capacity of the wireless propagation channel. Indeed, any suitable MIMO technique may be employed and combined with any suitable beamforming technique in accordance with disclosed embodiments.

Further, in some embodiments, the MIMO access node 310 may combine use of a suitable MIMO technique with a suitable beamforming technique when communicating directly with a wireless device, such as wireless device 338 in FIG. 3. However, in embodiments in which the MIMO access node 310 utilizes MIMO with beamforming for wireless backhaul with relay nodes, one or more advantages may be achieved. For example, because relay nodes 322, 324, and 326 may remain stationary during use, MIMO access node 310 may be better able to target the relay nodes 322, 324, and 326 due to their fixed nature. The foregoing feature may enable use of a combination of MIMO and beamforming techniques that would present difficulties in cases in which MIMO access node 310 is communicating directly with wireless devices 332, 334, 336, and 338. For example, communication with relay nodes may enable use of a MIMO technique in which each signal transmitted through the individual beam carries a different piece of the total information to be transmitted because the likelihood of any signal failing to be delivered is reduced.

Further, it should be noted that in some embodiments, multiple beams from the antennas 312, 314, and 316 may be formed to the relay nodes 322, 324, and 326 simultaneously. The data may be transmitted simultaneously to relay nodes 322, 324 and 326 through multiple beams.

Figure 5:
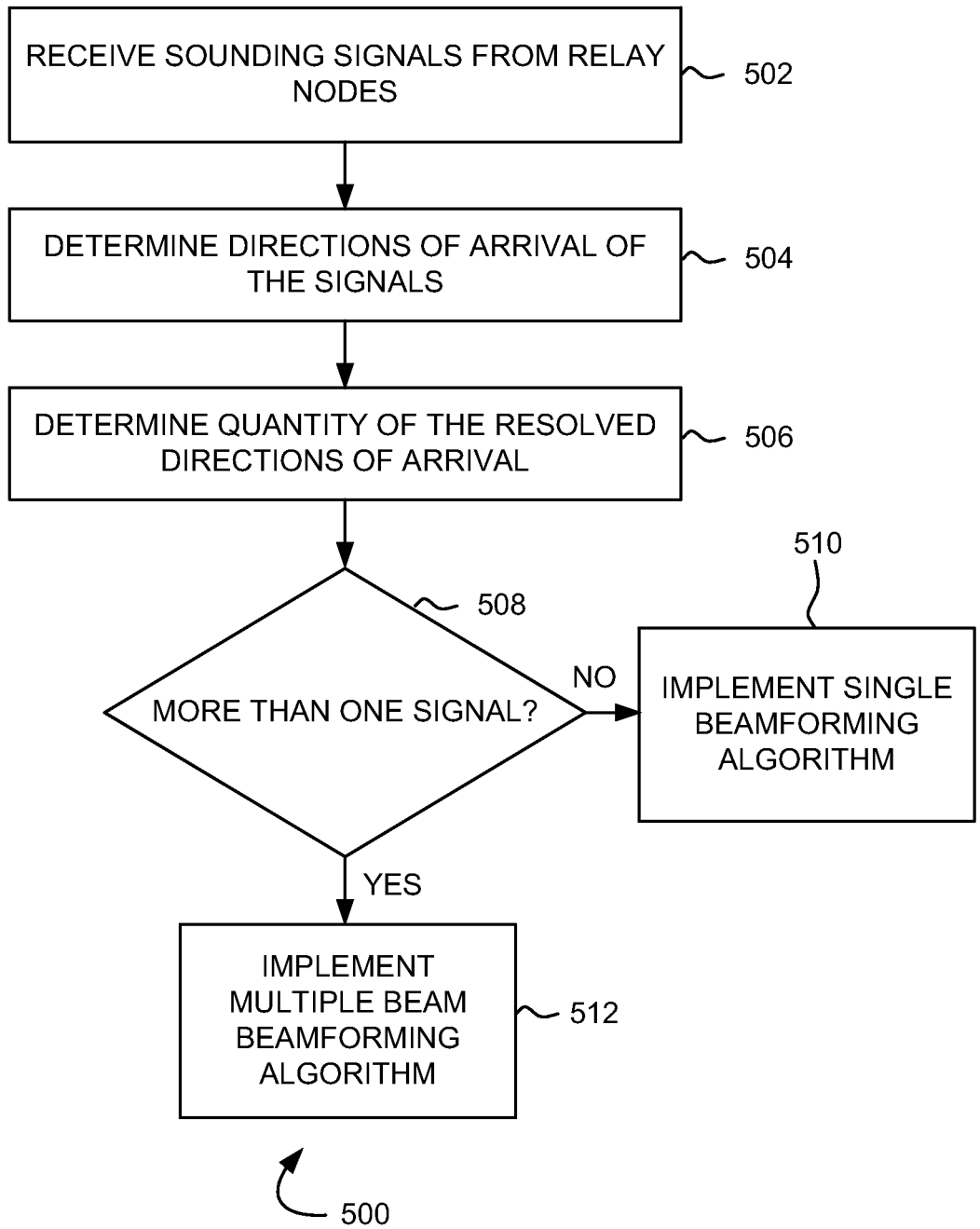
FIG. 5 illustrates an exemplary method for determining a beamforming algorithm based on received sounding signals.

FIG. 5 is a flow chart illustrating an embodiment of a method 500 for determining whether a single beamforming algorithm or a multiple beam beamforming algorithm should be employed in a given instance. The method 500 includes receiving one or more sounding signals from one or more relay nodes (block 502). For example, in the embodiment of FIG. 1, a single sounding signal may be received from relay node 108, whereas in the embodiment of FIG. 3, three sounding signals may be received, each from one of relay nodes 322, 324, or 326.

The method 500 further includes determining the directions of arrival of the received sounding signals (block 504) and the quantity of the resolved directions of arrival of the received sounding signals (block 506). The method 500 further includes querying whether more than one sounding signal has been received (block 508). If there is only one relay node and only a single sounding signal has been received, then a single beamforming algorithm is implemented (block 510). For example, in instances in which only a single sounding signal is received, MIMO access node 106 or 310 may opt to implement an embodiment of method 200 shown in FIG. 2. For example, MIMO access node 310 may detect a signal from only relay node 322. Then, MIMO access node 310 will form a single beam by combining the signals from antennas 312, 314, and 316.

Alternatively, if the query at block 508 indicates that more than one sounding signals are detected, MIMO access node 310 will implement a multiple beam beamforming algorithm (block 512). For example, MIMO access node 310 may implement the method 400 set forth in FIG. 4, or the method 200 set forth in FIG. 2 modified for multiple signals and relay nodes. Further, it should be noted that in some embodiments, MIM access node 310 may be configured to dynamically adjust the number of beams being formed, the beamforming technique being employed, and/or the type of MIMO technique utilized in response to changing operational conditions. For example, MIMO access node 310 may dynamically adjust the number of beams being formed based on the number of sounding signals received at a given time. Still further, in some embodiments, the ratio of the number of antennas to the number of beams formed may be selected to enable massive MIMO to be implemented. For example, in some embodiments, the number of antennas may be much greater than the number of beams. More specifically, in some embodiments, the number of antennas may be greater than the number of beams by 4 times.

Figure 6:
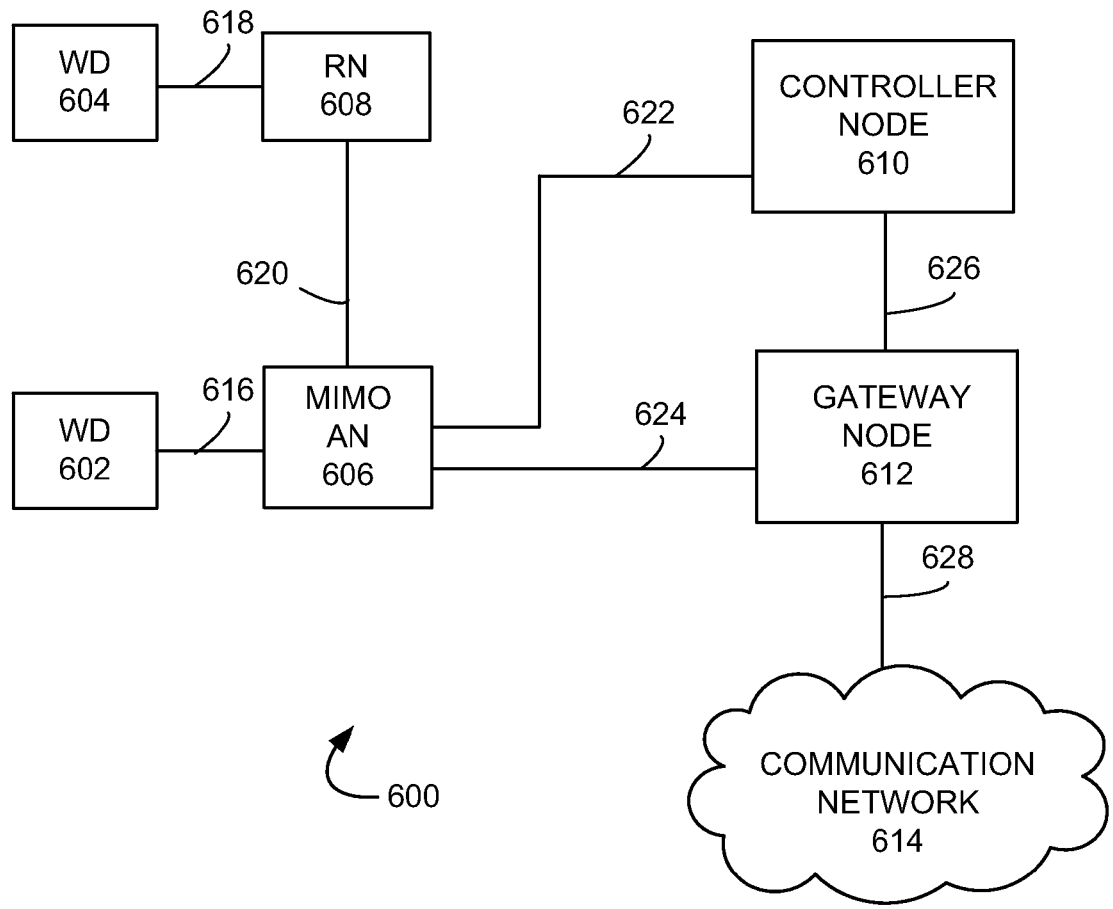
FIG. 6 illustrates another exemplary communication system including a controller node for transmitting data between a communication network and a wireless device.

FIG. 6 illustrates another exemplary communication system 600 to manage communications of a MIMO access node and a relay node, according to one embodiment. Communication system 600 may include wireless devices 602 and 604, MIMO access node 606, relay node 608, controller node 610, gateway node 612, communication network 614, and communication links 616, 618, 620, 622, 624, 626, and 628. Other network elements may be present in the communication system 600 to facilitate communication but are omitted for clarity, such as base stations, base station controllers, gateways, mobile switching centers, dispatch application processors, and location registers such as a home location register or visitor location register.

Wireless devices 602 and 604 can be any device configured to communicate over communication system 600 using a wireless communication link. For example, wireless devices 602 and 604 can include a cell phone, a smart phone, a computing platform such as a laptop, palmtop, or a tablet, a personal digital assistant, or an internet access device, and combinations thereof.

MIMO access node 606 and relay node 608 are network nodes capable of providing wireless communications to wireless devices 602 and 604, and can be, for example, a base transceiver station, a radio base station, an eNodeB device, or an enhanced eNodeB device. In an embodiment, MIMO access node 606 may include a macro cell while relay node 608 may include a small cell (e.g., femto cell, pico cell, micro cell, or the like) such that the coverage radius (e.g., the radius around each node where a wireless device may detect wireless signals transmitted from the node at a signal level above a threshold) for the macro cell is larger than the coverage radius for the small cell. As such, a macro cell may transmit wireless signals with a greater signal level (e.g., use a higher transmission power) than a small cell. In an embodiment, MIMO access node 606 can include a serving access node for wireless device 602 and rely node 608 can include a serving access node for wireless device 604. MIMO access node 606 may communicate with controller node 610 over communication link 622 and with gateway node 612 over communication link 624. MIMO access node 606 and relay node 608 may also communicate directly with each other over communication link 620. In an embodiment, rely node 608 can communicate directly with controller node 610 and gateway node 612 over communication links (not depicted).

Controller node 610 can be any network node configured to manage services within system 600. Controller node 610 may provide other control and management functions for system 600. The controller node 610 can be a single device having various functions or a plurality of devices having differing functions. For example, controller node 610 can include at least one of a multi-cell/multicast coordination entity (MCE), a mobility management entity (MME), a radio network controller (RNC), a mobile switching center (MSC), and a combination thereof.

Controller node 610 can include a processor and associated circuitry to execute or direct the execution of computer-readable instructions to obtain information. Controller node 610 can retrieve and execute software from storage, which can include a disk drive, a flash drive, memory circuitry, or some other memory device, and which can be local or remotely accessible. The software may include computer programs, firmware, or some other form of machine-readable instructions, and may include an operating system, utilities, drivers, network interfaces, applications, or some other type of software, including combinations thereof. Controller node 610 can receive instructions and other input at a user interface. Controller node 610 can include a processor and associated circuitry to execute or direct the execution of computer-readable instructions to obtain information.

Gateway node 612 is a network element which can include a processor and associated circuitry to execute or direct the execution of computer-readable instructions. Gateway node 612 may retrieve and execute software from storage, which can include a disk drive, flash drive, memory circuitry, or some other memory device, and which can be local or remotely accessible. The software includes computer programs, firmware, or some other form of machine-readable instructions, and may include an operating system, utilities, drivers, network interfaces, applications, or some other type of software, including combinations thereof. In an embodiment, gateway node 612 can provide instructions to MIMO access node 606 and relay node 608 related to channel selection in communications with wireless devices 602 and 604. For example, gateway node 612 can include at least one of a serving gateway (SGW), a packet data network gateway (PDNGW), a cellular gateway (CGW), and a combination thereof.

Communication network 614 can be a wired and/or wireless communication network, and can include processing nodes, routers, gateways, and physical and/or wireless data links for carrying data among various network elements, including combinations thereof, and can include a local area network, a wide area network, and an internetwork (including the Internet). Communication network 614 may also include base stations, wireless communication nodes, telephony switches, internet routers, network gateways, computer systems, communication links, or some other type of communication equipment, and combinations thereof. Wireless network protocols may include code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, and Third Generation Partnership Project Long Term Evolution (3GPP LTE). Wired network protocols that may be utilized by communication network 414 include Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM).

Communication links 616, 618, 620, 622, 624, 626, and 628 can be wired or wireless communication links. Wired communication links can be, for example, twisted pair cable, coaxial cable or fiber optic cable, or combinations thereof. Wireless communication links can be a radio frequency, microwave, infrared, or other similar signal, and can use a suitable communication protocol, for example, Global System for Mobile telecommunications (GSM), Code Division Multiple Access (CDMA), or Long Term Evolution (LTE), or combinations thereof. Other wireless protocols can also be used.

Other network elements may be present in the communication system 600 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication among access node 606 and relay node 608, controller node 610, gateway node 612, and communication network 614 which are omitted for clarity, including additional processing nodes, routers, gateways, and physical and/or wireless data links for carrying data among the various network elements.

Figure 4:
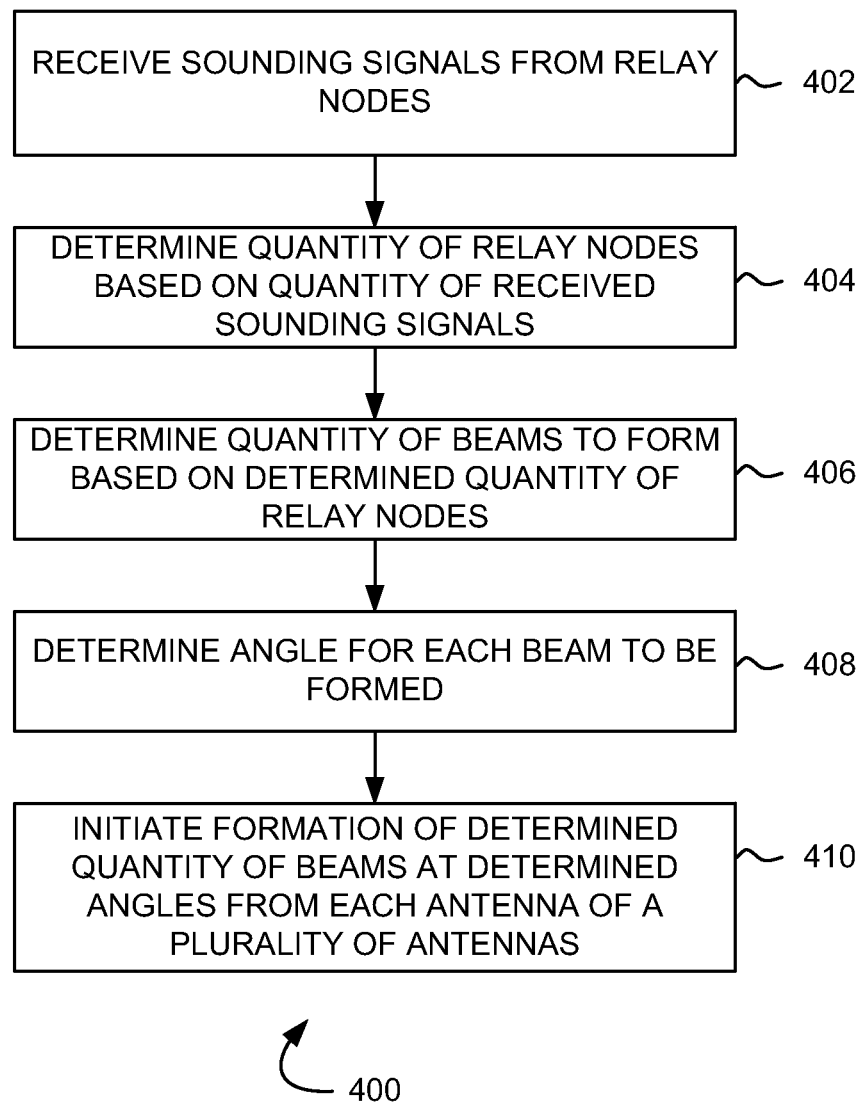
FIG. 4 illustrates another exemplary method of establishing communication between a MIMO access node and a relay node.

In an embodiment, any of controller node 610, gateway node 612, one or more modules of MIMO access node 606, and one or more modules of relay node 608 may perform all or parts of the methods of FIGS. 2, 4, and 5.

In operation, access node 606 may establish communication with wireless device 602 such that access node 606 provides the wireless device access to a communication network (e.g., communication network 614). Similarly, relay node 608 may establish communication with wireless device 604 such that relay node 608 provides the wireless device access to a communication network (e.g., communication network 614).

In an embodiment, MIMO access node 606 may include a macro cell and relay node 608 may include a small cell (e.g., femto cell, pico cell, micro cell, or the like). For instance, the coverage radius for the macro cell may be larger than the coverage radius for the small cell. In this example, relay node 608 may communicate with MIMO access node 606 in order to communicate with controller node 610, gateway node 612, or communication network 614.

For example, MIMO access node 606 may be in communication with controller node 610, gateway node 612, or communication network 614 in order to provide wireless services for wireless devices 602 and 604. Controller node 610, gateway node 612, or communication network 614 may include a core network that may perform functions in order to provide wireless service for wireless devices 602 and 604. For example, an element of the core network (e.g., controller node 610) may instruct network elements to establish a data bearer for wireless device 602. Accordingly, a data bearer may be established throughout the core network such that data may be transmitted to and from wireless device 602 over the established data bearer. In another example, an element of the core network (e.g., gateway node 612) may enable wireless device 602 to communicate with an external data network (e.g., the Internet). Here, data may be communicated between gateway node 612 and wireless device 602 such that wireless device 602 may communicate with the external network (e.g., the Internet).

In an embodiment, relay node 608 may communicate with controller node 610, gateway node 612, or communication network 614 using MIMO access node 606. For example, relay node 608 may transmit data to access node 606 such that the transmitted data is used to enable wireless device 604 to access an external network (e.g., the Internet) or to enable wireless device 604 to use services provided by the core network (e.g., voice services). Here, communication link 620 may be used to communicate data between MIMO access node 606 and relay node 608 (e.g., by employing one or more beamforming techniques). MIMO access node 606 may then transmit the data to and from controller node 610, gateway node 612, or communication network 614.

In an embodiment, relay node 608 may be in direct communication with controller node 610, gateway node 612, or communication network 614 (e.g., using communication links not depicted). Here, relay node 608 may directly communicate with one of controller node 610, gateway node 612, or communication network 614 for a first portion of traffic between the network elements and may use MIMO access node 606 for a second portion of traffic between the network elements. In another embodiment, relay node 608 may be in communication with a second access node (not depicted). Here, relay node 608 may communicate with one of controller node 610, gateway node 612, or communication network 614 using MIMO access node 606 for a first portion of traffic between the network elements and may communicate using the second access node for a second portion of traffic between the network elements.

In an embodiment, MIMO access node 606 and relay node 608 may communicate over the air (e.g., communication link 620 may include a wireless communication link). Accordingly, a frequency band from a set of frequency bands may be used for communication between MIMO access node 606 and relay node 608. In addition, the set of frequency bands may be used for other wireless communication (e.g., communication between MIMO access node 606 and wireless devices in communication with MIMO access node 606, communication between relay node 608 and wireless devices in communication with relay node 608, and the like). A system that efficiently allocates wireless spectrum to MIMO access node 606 and relay node 608 may provide enhanced services to wireless devices using communication system 600.

Figure 7:
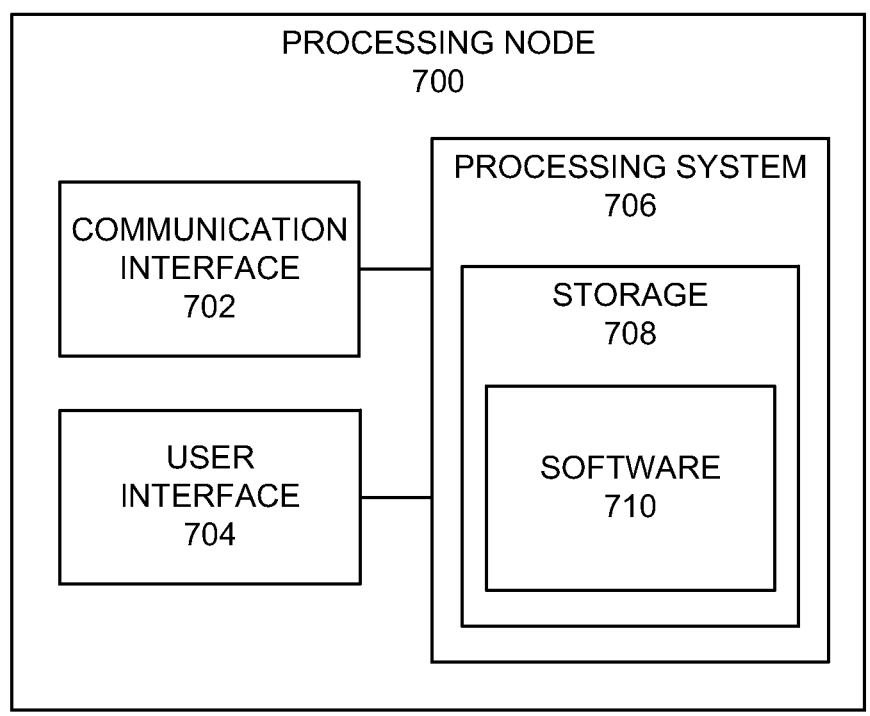
FIG. 7 illustrates an exemplary processing node.

FIG. 7 illustrates an exemplary processing node 700 in a communication system. Processing node 700 includes communication interface 702, user interface 704, and processing system 706 in communication with communication interface 702 and user interface 704. Processing node 700 can be configured to instruct the sending of data packets to a wireless device. Processing system 706 includes storage 708, which can include a disk drive, flash drive, memory circuitry, or other memory device. Storage 708 can store software 710, which is used in the operation of the processing node 700. Storage 708 may include a disk drive, flash drive, data storage circuitry, or some other memory apparatus. Software 710 may include computer programs, firmware, or some other form of machine-readable instructions, including an operating system, utilities, drivers, network interfaces, applications, or some other type of software. Processing system 706 may include a microprocessor and other circuitry to retrieve and execute software 710 from storage 708. Processing node 700 may further include other components such as a power management unit, a control interface unit, etc., which are omitted for clarity. Communication interface 702 permits processing node 700 to communicate with other network elements. User interface 704 permits the configuration and control of the operation of processing node 700.

Examples of processing node 700 include MIMO access node 106, MIMO access node 606, gateway node 612, and controller node 610. Processing node 700 can also be an adjunct or component of a network element, such as an element of MIMO access node 106, MIMO access node 606, gateway node 612, or controller node 610. Processing node 700 can also be another network element in a communication system. Further, the functionality of processing node 700 can be distributed over two or more network elements of a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention, and that various modifications may be made to the configuration and methodology of the exemplary embodiments disclosed herein without departing from the scope of the present teachings. Those skilled in the art also will appreciate that various features disclosed with respect to one exemplary embodiment herein may be used in combination with other exemplary embodiments with appropriate modifications, even if such combinations are not explicitly disclosed herein. As a result, the invention is not limited to the specific embodiments described above, but only by the following claims and their equivalents.

What is claimed is:

1. A method for establishing communication between a wireless device and a communication network, comprising:
   receiving, at a macro cell access node, one or more sounding signals from one or more relay nodes, wherein each of the one or more relay nodes comprises a small cell access node configured to relay data between the macro cell access node and one or more wireless devices;
   determining, at the macro cell access node, parameters of beam formation based on the received one or more sounding signals, the parameters comprising: a covariance matrix, and a weighting vector based on the covariance matrix, a quantity of beams to be formed, and an angle of arrival of the one or more sounding signals, wherein the quantity of beams to be formed is based on a quantity of the one or more sounding signals;
   initiating formation of one or more beams from two or more antennas of the macro cell access node to the one or more relay nodes based on the determined parameters;
   transmitting, from a first antenna of the two or more antennas to a first relay node of the one or more relay nodes, a first subframe comprising reference signal resource elements; and
   transmitting, from a second antenna of the two or more antennas to the first relay node, a second subframe comprising data signal resource elements,
   wherein the first and second subframes are transmitted simultaneously such that the reference signal resource elements and the data signal resource elements overlap in time and frequency.

2. The method of claim 1, wherein the parameters of beam formation includes transmission directions for each of the one or more beams, and the transmission directions are determined based on the direction of arrival of the one or more sounding signals.

3. The method of claim 1, comprising dynamically adjusting the number of beams formed and transmitted to the relay nodes based on the number of sounding signals received over time.

4. The method of claim 1, wherein the quantity of antennas is greater than the quantity of beams by a factor of at least 4 times.

5. The method of claim 1, wherein each of the two or more antennas is configured to transmit a beam to each of the one or more relay nodes.

6. The method of claim 1, wherein the one or more beams from the two or more antennas are simultaneously transmitted to the one or more relay nodes.

7. The method of claim 1, wherein each of the one or more beams is transmitted over the same frequency spectrum.

8. A wireless communication system, comprising:
a MIMO access node comprising a macro cell access node and a plurality of antennae; and
a plurality of relay nodes configured to relay data between the MIMO access node and one or more wireless devices, each of the plurality of relay nodes comprising a small cell access node;
wherein the MIMO access node is configured to:
receive one or more sounding signals from the plurality of relay nodes and to simultaneously transmit, via the plurality of antennae, a plurality of beams in a plurality of different directions toward each of the plurality of relay nodes;
determine a covariance matrix, a quantity of beams to be formed, and a weighting vector for each of the plurality of beams, the quantity of beams being based on a quantity of the one or more sounding signals, and the weighting vector being based on the covariance matrix and an angle of arrival of the one or more sounding signals;
transmit, from a first antenna of the plurality of antennae to a first relay node of the plurality of relay nodes, a first subframe comprising reference signal resource elements; and
transmitting, from a second antenna of the plurality of antennae to the first relay node, a second subframe comprising data signal resource elements,
wherein the first and second subframes are transmitted simultaneously such that the reference signal resource elements and the data signal resource elements overlap in time and frequency.

9. The system of claim 8, wherein the quantity of antennas is greater than the quantity of beams by a factor of at least 4 times.

10. The system of claim 8, wherein each of the plurality of beams is transmitted to each of the plurality of relay nodes across the same frequency spectrum.

11. The system of claim 8, wherein the MIMO access node is configured to determine if a single sounding signal is received or if multiple sounding signals are received, and when a single sounding signal is received, to implement a single beamforming algorithm, and when multiple sounding signals are received, to implement a multiple beamforming algorithm.

12. The system of claim 8, wherein the MIMO access node is further configured to receive one or more sounding signals from the one or more wireless devices.

13. A system for establishing communication between a wireless device and a communication network, the system comprising:
a controller node configured to:
receive, via a plurality of antennae coupled to a macro cell access node, one or more sounding signals from one or more relay nodes, wherein each of the one or more relay nodes comprises a small cell access node configured to relay data between the macro cell access node and one or more wireless devices;
determine parameters of beam formation based on the received one or more sounding signals, the parameters comprising: a covariance matrix, and a weighting vector based on the covariance matrix, a quantity of beams to be formed, and an angle of arrival of the one or more sounding signals, wherein the quantity of beams to be formed is based on a quantity of the one or more sounding signals;
initiate formation of one or more beams from four or more antennae of the plurality of antennae to the one or more relay nodes based on the determined parameters;
transmit, from a first antenna of the plurality of antennae to a first relay node of the one or more relay nodes, a first subframe comprising reference signal resource elements; and
transmit, from a second antenna of the plurality of antennae to the first relay node, a second subframe comprising data signal resource elements,
wherein the first and second subframes are transmitted simultaneously such that the reference signal resource elements and the data signal resource elements overlap in time and frequency.

14. The system of claim 13, wherein the quantity of antennas is greater than the quantity of beams by a factor of at least 4 times.

15. The system of claim 13, wherein the parameters of beam formation include transmission directions for each of the one or more beams and a quantity of beams to be formed.

16. The system of claim 13, wherein the one or more beams from the four or more antennas are simultaneously transmitted to the one or more relay nodes.

17. The system of claim 13, wherein each of the one or more beams is transmitted over the same frequency spectrum.

* * * * *